US009250453B2

(12) United States Patent
Aflatouni et al.

(10) Patent No.: US 9,250,453 B2
(45) Date of Patent: Feb. 2, 2016

(54) INTEGRATED LIGHT SOURCE INDEPENDENT LINEWIDTH REDUCTION OF LASERS USING ELECTRO-OPTICAL FEEDBACK TECHNIQUES

(71) Applicant: California Institute of Technology, Pasadena, CA (US)

(72) Inventors: Firooz Aflatouni, Pasadena, CA (US); Behrooz Abiri, Pasadena, CA (US); Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/863,315

(22) Filed: Apr. 15, 2013

(65) Prior Publication Data

US 2014/0140652 A1 May 22, 2014

Related U.S. Application Data

(60) Provisional application No. 61/624,165, filed on Apr. 13, 2012.

(51) Int. Cl.

*G02F 1/035* (2006.01)
*G02F 1/01* (2006.01)
*H01S 3/13* (2006.01)
*H01S 3/00* (2006.01)

(52) U.S. Cl.

CPC .............. *G02F 1/011* (2013.01); *H01S 3/1307* (2013.01); *H01S 3/005* (2013.01); *H01S 3/0085* (2013.01); *H01S 2301/02* (2013.01)

(58) Field of Classification Search

CPC .............. H01S 3/10053; H01S 3/1305; H01S 5/06817; G03F 7/70308; H04B 10/2507
USPC ........................ 385/3; 250/200, 201.1, 201.9; 372/25–27, 29.01–29.011
See application file for complete search history.

(56) References Cited

U.S. PATENT DOCUMENTS 4,847,477 A 7/1989 Smith
4,896,336 A * 1/1990 Henely et al. ................ 375/324

(Continued)

FOREIGN PATENT DOCUMENTS

JP 10-090740 A 4/1998
JP 2007-235821 A 9/2007

(Continued)

OTHER PUBLICATIONS

International Search Report and Written Opinion for International Patent Application No. PCT/US2013/036661, mailed on Jul. 26, 2013, 13 pages.

(Continued)

*Primary Examiner* — Ellen Kim
(74) *Attorney, Agent, or Firm* — Alston & Bird LLP

(57) ABSTRACT

An integrated optical linewidth reduction system includes a phase modulator adapted to modulate the phase of an incoming optical signal in response to a feedback control signal defined by a first electrical signal. The phase modulator is further adapted to generate a first optical signal travelling through a first optical path. The first electrical signal is representative of a phase noise of the first optical signal. An optical linewidth of the first optical signal is less than an optical linewidth of the incoming optical signal.

31 Claims, 5 Drawing Sheets

200
105 OUTPUT LIGHT
102 LASER
115
114 OPTICAL PHASE MODULATOR
134
SPLITTER 104
110
124
112 K DRIVER
130 PHASE WRAPPER (WITH OR WITHOUT INTEGRATION)
120 PHASE/FREQUENCY NOISE DETECTOR

(56) References Cited

U.S. PATENT DOCUMENTS 5,222,246 A * 6/1993 Wolkstein ............... H03F 3/602 330/107
5,355,243 A * 10/1994 King ...................... H04B 10/61 398/203
7,477,852 B2 * 1/2009 Agarwal .............. H04B 10/674 239/202
7,848,370 B2 * 12/2010 Kewitsch et al. ........ 372/29.011
7,949,260 B2 * 5/2011 Fukuchi ............... H04B 10/677 356/460
8,045,656 B2 * 10/2011 Li ................................. 375/344
8,121,494 B2 * 2/2012 Andrew ............... H04B 10/677 398/183
2007/0206962 A1 9/2007 Iannelli
2009/0296751 A1 * 12/2009 Kewitsch et al. ............... 372/18
2009/0314763 A1 * 12/2009 Chu et al. ...................... 219/476
2013/0221211 A1 * 8/2013 Witzens ................... 250/227.11
2013/0322807 A1 12/2013 Aflatouni et al.

FOREIGN PATENT DOCUMENTS

JP 2011-049970 A 3/2011
WO 2013/078432 A1 5/2013
WO 2013/155533 A1 10/2013

OTHER PUBLICATIONS

International Search Report and Written Opinion in PCT Application No. PCT/US2012/066423 mailed Mar. 4, 2013, 11 pages.

International Preliminary Report on Patentability and Written Opinion for PCT Application No. PCT/US2013/036661 issued Oct. 14, 2014, 10 pages.

* cited by examiner

INTEGRATED LIGHT SOURCE INDEPENDENT LINEWIDTH REDUCTION OF LASERS USING ELECTRO-OPTICAL FEEDBACK TECHNIQUES

CROSS-REFERENCE TO RELATED APPLICATIONS

The present application claims benefit under 35 USC 119 (e) of U.S. Provisional Application No. 61/624,165, filed Apr. 13, 2012, entitled "Integrated Light Source Independent Linewidth Reduction of Lasers Using Electro-Optical Feedback Techniques", the content of which is incorporated herein by reference in its entirety. The present application is related to U.S. application Ser. No. 13/684,061, filed Nov. 21, 2012, entitled "Integrated Light Source Independent Linewidth Reduction of Lasers Using Feed-Forward Techniques", the content of which is incorporated herein by reference in its entirety.

BACKGROUND OF THE INVENTION

The present invention is related to optical signals, and more particularly to reducing a linewidth of an optical signal.

Compact lasers with narrow linewidth are known and used in applications such as coherent optical communication systems, portable and non-portable high resolution LIDAR systems, mm-wave and THz signal generation, optical imagers, optical phased arrays, sensing, opto-electronic oscillators, molecular and bio-molecular spectroscopy devices, and the like.

Commercially available Sub-KHz fiber laser linewidths have been achieved at the expense of weak tunability, large form factor, small wall-plug efficiency, and undesired mode hoping characteristic. Using a conventional feedback technique to cancel phase noise over a large frequency bandwidth often results in feedback loop instability because the laser is part of the feedback loop. Thus, the laser's characteristics such as its FM response may effect the loop performance such as the phase noise reduction bandwidth. Accordingly, a need continues to exist for an optical signal linewidth reduction system that overcomes the shortcomings of the conventional linewidth reduction systems.

BRIEF SUMMARY

According to one embodiment of the present invention, an integrated optical linewidth reduction system includes a phase modulator adapted to modulate the phase of an incoming optical signal in response to a feedback control signal defined by a first electrical signal. The phase modulator is further adapted to generate a first optical signal travelling through a first optical path. The first electrical signal is representative of a phase noise of the first optical signal. An optical linewidth of the first optical signal is less than an optical linewidth of the incoming optical signal.

According to one embodiment, the incoming optical signal is a laser beam. According to one embodiment, the integrated optical linewidth reduction system further includes a first splitter/coupler adapted to split the first optical signal into at least second and third optical signals travelling through second and third optical paths. The integrated optical linewidth reduction system further includes a second splitter/coupler adapted to split the third optical signal into at least fourth and fifth optical signals travelling through fourth and fifth optical paths. The fourth optical path has a longer propagation delay than the fifth optical path.

A third splitter/coupler is adapted to generate a sixth optical signal by coupling a first portion of the fourth optical signal with a first portion of the fifth optical signal and deliver the sixth optical signal to a sixth optical path. The third splitter/coupler is further adapted to generate a seventh optical signal by coupling a second portion of the fourth optical signal with a second portion of the fifth optical signal and deliver the seventh optical signal to a seventh optical path. The integrated optical linewidth reduction system further includes a photo detection circuit comprising first and second photo detectors. The first photo detector is adapted to generate a second electrical signal in response to the sixth optical signal. The second photo detector is adapted to generate a third electrical signal in response to the seventh optical signal. The photo detection circuit supplies a fourth electrical signal in response to the second and third electrical signals. The fourth electrical signal is representative of a phase noise of the first optical signal.

According to one embodiment, the integrated optical linewidth reduction system further includes a true-time delay element disposed in the fourth optical path adapted to cause the longer propagation delay. According to one embodiment, the integrated optical linewidth reduction system further includes a resonator disposed in the fourth optical path adapted to cause the longer propagation delay. The integrated optical linewidth reduction system further includes a controller adapted to vary a delay associated with the resonator in accordance with a sample of the fourth electrical signal. According to one embodiment, the integrated optical linewidth reduction system further includes a ring/disk resonator disposed in the fourth optical path adapted to cause the longer propagation delay. According to one embodiment, the integrated optical linewidth reduction system further includes a waveguide grating disposed in the fourth optical path adapted to cause the longer propagation delay.

According to one embodiment, each of the first and second photo detectors is a photo diode. According to one embodiment, the first portion of the fourth optical signal is substantially equal to the first portion of the fifth optical signal According to one embodiment, the first portion of the fourth optical signal is different from the first portion of the fifth optical signal. According to one embodiment, the second portion of the fourth optical signal is substantially equal to the second portion of the fifth optical signal.

According to one embodiment, the integrated optical linewidth reduction system further includes a phase wrapper adapted to generate the feedback control signal from the fourth electrical signal. According to one embodiment, the phase wrapper includes a phase rotator adapted to generate an in-phase signal and a quadrature-phase signal in response to the fourth electrical signal. The phase wrapper further includes an inverter adapted to perform a modulo operation on the in-phase and quadrature-phase signals.

According to one embodiment, the inverter includes a first mixer adapted to generate a first frequency converted signal in response to the in-phase signal and a first oscillating signal. The inverter further includes a second mixer adapted to generate a second frequency converted signal in response to the quadrature-phase signal and a second oscillating signal. The inverter further includes a first adder/subtractor adapted to subtract the second frequency converted signal from the first frequency converted signal, and a first counter adapted to count a number of transitions of the first adder/subtractor. The inverter further includes a second counter adapted to count a number of transitions of the second oscillating signal, and a second adder/subtractor adapted to subtract the second counter's count from the first counter's count to generate a difference representative of the phase noise of the first optical signal.

According to one embodiment, the integrated optical linewidth reduction system further includes a digital-to-analog converter adapted to convert an output signal of the second adder/subtractor to an analog signal. The integrated optical linewidth reduction system further includes a driver adapted to generate and apply the feedback control signal to the phase modulator in response to the analog signal.

According to one embodiment, the phase wrapper includes an integrator circuit adapted to integrate the fourth electrical signal to generate an integrated signal. The phase wrapper further includes a control circuit adapted to maintain the integrated signal between a first predetermined voltage and a second predetermined voltage by changing the integrated signal by a value associated with a phase shift of $2\pi$ in the phase modulator.

According to one embodiment, the integrator circuit includes an operational amplifier including an inverting input coupled to the fourth electrical signal. The integrator circuit includes a first capacitor having a first capacitance value coupled between the inverting input of the operational amplifier and an output of the operational amplifier. The control circuit includes a first comparator adapted to compare the integrated signal to the first predetermined voltage. The control circuit further includes a second comparator adapted to compare the integrated signal to the second predetermined voltage. The control circuit further includes a first switch adapted to charge a second capacitor to a third predetermined voltage. The first switch is further adapted to transfer a first charge from the second capacitor to the first capacitor thereby reducing the integrated signal by a value associated with a phase shift of $2\pi$ in the phase modulator when the first comparator detects the integrated signal is substantially equal to the first predetermined voltage. The control circuit further includes a second switch adapted to charge a third capacitor to a fourth predetermined voltage. The second switch is further adapted to transfer a second charge from the third capacitor to the first capacitor thereby increasing the integrated signal by a value associated with a phase shift of $2\pi$ in the phase modulator when the second comparator detects the integrated signal is substantially equal to the second predetermined voltage.

According to one embodiment of the present invention, a method of reducing linewidth of an incoming optical signal includes modulating the phase of the incoming optical signal in response to a feedback control signal defined by a first electrical signal, and generating a first optical signal travelling through a first optical path. The first electrical signal is representative of a phase noise of the first optical signal. An optical linewidth of the first optical signal is less than an optical linewidth of the incoming optical signal.

According to one embodiment, the method further includes splitting the first optical signal into at least second and third optical signals travelling through second and third optical paths. The method further includes splitting the third optical signal into at least fourth and fifth optical signals travelling through fourth and fifth optical paths and causing the fourth optical path to have a longer propagation delay than the fifth optical path. The method further includes generating a sixth optical signal by coupling a first portion of the fourth optical signal with a first portion of the fifth optical signal, and generating a seventh optical signal by coupling a second portion of the fourth optical signal with a second portion of the fifth optical signal. The method further includes generating a second electrical signal in response to the sixth optical signal, generating a third electrical signal in response to the seventh optical signal, and generating a fourth electrical signal in response to the second and third electrical signals, the fourth electrical signal being representative of a phase noise of the first optical signal.

A better understanding of the nature and advantages of the embodiments of the present invention may be gained with reference to the following detailed description and the accompanying drawings.

DETAILED DESCRIPTION

Figure 1:
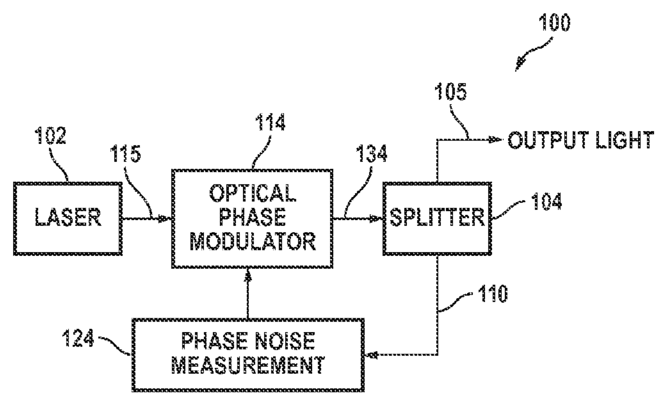
FIG. 1 is a simplified block diagram of an integrated light source independent feedback linewidth reduction system, in accordance with one exemplary embodiment of the present invention.

FIG. 1 is a simplified block diagram of an integrated light source independent feedback linewidth reduction system 100, in accordance with one exemplary embodiment of the present invention. Light source independent feedback linewidth reduction system (alternatively referred to herein as linewidth reduction system) 100 is shown as including, in part, a splitter 104, an optical phase modulator 114, and a phase noise measurement block 124. Optical phase modulator 114 receives an incoming optical signal 115 from optical signal source 102 and is adapted to generate optical signal 134. Optical phase modulator 114, splitter 104, and phase noise measurement block 124 are coupled or connected in a feedback loop. Linewidth reduction system 100 is adapted to detect the phase noise of the optical signal 134 and subtract the detected phase noise from the phase of the received incoming optical signal 115 using negative feedback, thereby to deliver an optical signal 105 from splitter 104 that has a substantially reduced phase noise and linewidth than the received incoming optical signal 115. In the exemplary embodiment shown in FIG. 1, optical signal source 102 is shown as being a Laser and incoming optical signal 115 being a laser beam. It is understood, however, that optical source 102 may be any source generating an optical signal having a substantially high degree of coherence.

Optical signal source 102 is not part of the feedback loop in linewidth reduction system 100. Thus, the characteristics of optical signal source 102 do not affect the loop performance as in conventional linewidth reduction systems that may use feedback. For example, in conventional linewidth reduction systems the frequency modulation (FM) characteristics of a laser signal source may worsen the loop performance. Linewidth reduction system 100 thus provides better linewidth reduction than conventional linewidth reduction systems with feedback.

In one embodiment, the various electrical and optical components/block of linewidth reduction system 100 may be integrated on the same substrate. In another embodiment, the various electrical components/block of linewidth reduction system 100 may be integrated on a first substrate, the various optical components/block of linewidth reduction system 100 may be integrated on a second substrate. In yet other embodiments, linewidth reduction system 100 may be formed on two or more substrates each having disposed thereon one or more electrical and one or more optical components.

For simplicity, the same reference number may be used to identify both the optical path through which an optical signal travels, as well as to the optical signal which travels through that path. For example, reference numeral 110 may refer to the optical path so identified in FIG. 1, or alternatively to the optical signal that travels through this path. Furthermore, in the following, the terms power divider, power splitter, Y-junction, coupler, or combiner are alternatively used to refer to an optical element adapted to split/divide a signal to generate more signals and/or couple/combine a multitude of optical signals to generate one or more signals. Such a component is also alternatively referred to herein as splitter/coupler.

Splitter/coupler 104 is adapted to split optical signal 134 from optical phase modulator 114 into two optical signals delivered to optical paths 105, 110. Accordingly, the two signals travelling through paths 105, 110 may be defined as $e^{-j(\omega t+\O(t))}$, with ω and Ø(t) respectively representing the frequency and the phase noise of optical signal 134. Optical signal 110 is coupled to phase noise measurement block 124. Phase noise measurement block 124 is adapted to detect the phase or frequency noise of optical signals 134, 110, 105 and convert the detected phase or frequency noise (phase/frequency noise) of optical signals 134, 110, 105 to an electrical current or voltage signal, which then controls, in-part, optical phase modulator 114.

Optical phase modulator 114 is adapted to modulate the phase of incoming optical signal 115 in response to a feedback control signal defined by the electrical current or voltage signal from phase noise measurement block 124. The electrical current or voltage signal from phase noise measurement block 124, representing the phase noise of optical signal 134, is used to subtract the detected phase noise of optical signal 134 from the phase of the received incoming optical signal 115, thus providing negative feedback. The negative feedback reduces the optical linewidth in optical signals 134, 110, 105 in relation to incoming optical signal 115. Optical signal 105 is provided as the output of light source independent feedback linewidth reduction system 100 by splitter/coupler 104.

Figure 2:
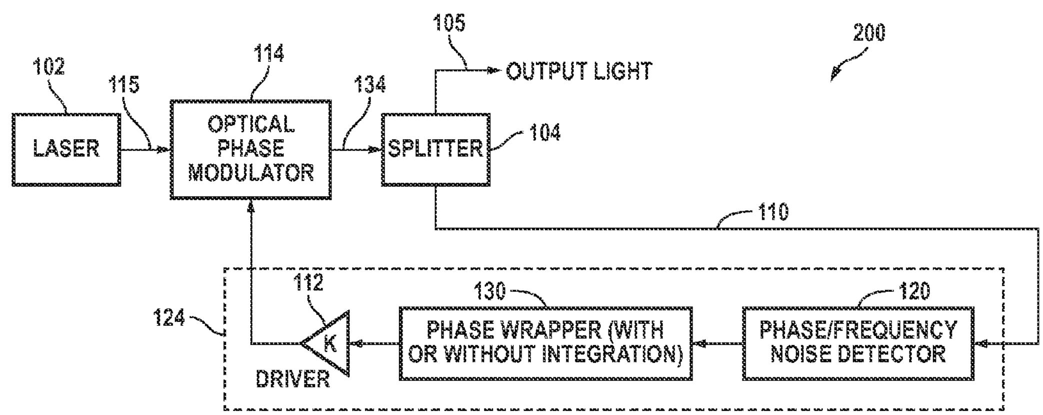
FIG. 2 is a simplified block diagram of an integrated light source independent feedback linewidth reduction system, in accordance with another exemplary embodiment of the present invention.

FIG. 2 is a simplified block diagram of an integrated light source independent feedback linewidth reduction system 200, in accordance with another exemplary embodiment of the present invention. Linewidth reduction system 200 is similar to and operates in the same manner as linewidth reduction system 100 except that linewidth reduction system 200 includes a phase/frequency noise detector 120, a phase wrapper 130, and a driver 112 together representing phase noise measurement block 124.

Phase/frequency noise detector 120 is adapted to detect the phase or frequency noise of optical signals 134, 110, 105 via optical signal 110 and convert the detected phase or frequency noise (phase/frequency noise) of optical signal 110 to an electrical current or voltage signal. A number of different systems may be used to detect the phase or frequency noise of an optical signal, such as the Mach-Zehnder Interferometer (MZI) with unequal delay between the interferometer arms, multiple beam interferometers (e.g., Fiber Bragg Gratings), and Fabry-Perot resonators. If the detected signal contains the frequency noise information of the optical signal, it is integrated to provide the phase noise information. Phase wrapper 130 is adapted to wrap the detected phase by performing a modulo it operation to generate a phase noise defined by $\phi_m(t)=\mathrm{mod}(\phi(t), 2\pi)$. Driver 112 is adapted to amplify the output signal of phase wrapper 108, which is representative of the phase noise of the optical signal 134, and deliver the amplified signal to optical phase modulator 114. Optical phase modulator 114 is adapted to modulate the phase of incoming optical signal 115 in accordance with the signal it receives from driver 112. In other words, optical phase modulator 114 is adapted to subtract the detected phase noise from the phase of incoming optical signal 115, and in response deliver an optical signal 134 that has a substantially reduced phase noise and linewidth.

Figure 3A:
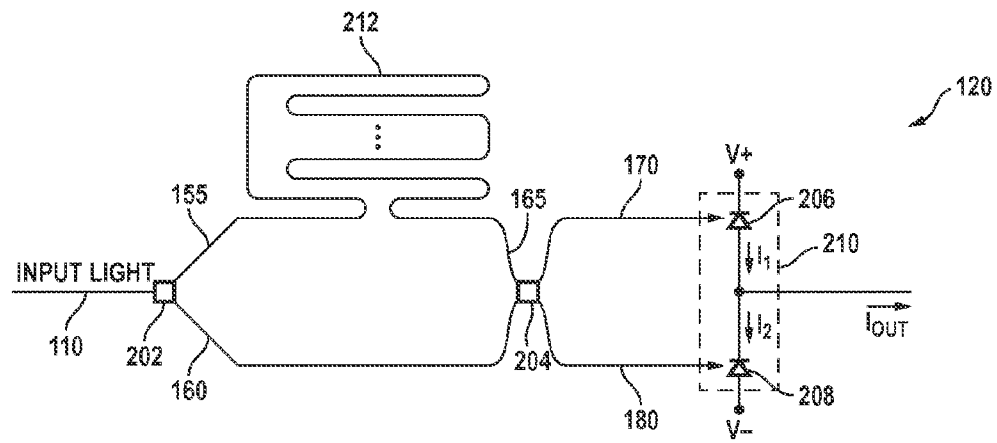
FIGS. 3A-3F are simplified block diagrams of the phase/frequency noise detector shown in FIG. 2, in accordance with various exemplary embodiments of the present invention.

FIG. 3A is a simplified block diagram of frequency/phase noise detector 120 shown in FIG. 2, in accordance with one embodiment of the present invention. Optical signal received from optical path 110 is split into two signals via splitter/coupler 202 and delivered to optical paths 155, 160. Disposed between optical paths 155 and 165 is a true-time delay element 212 adapted to delay the propagation time of the optical signal travelling from splitter/coupler 202 to splitter/coupler 204 via optical paths 155, 165.

Coupler 204 is adapted to couple the two optical signals it receives from paths 160, 165 in accordance with a predefined ratio. For example, in one embodiment, such as the embodiment shown in FIG. 3A, splitter/coupler 204 couples 50% of the optical signal travelling through path 160 with 50% of the optical signal travelling through path 165 and delivers the coupled signal to photo detector 206 via path 170. Coupler 204 couples the remaining 50% of the optical signal travelling through path 160 with the remaining 50% of the optical signal travelling through path 165 and delivers the coupled signal to photo detector 208 via path 180. In another embodiment, splitter/coupler 204 may apply a different ratio to generate the optical signals it delivers to paths 170, 180. Photo-detectors 206, 208 are disposed in a photo-detection circuit 210.

As described above, a first component of the optical signal delivered to each of the photo detectors 206, 208 is received from path 160, and a second component of the optical signal delivered to each of the photo detectors 206, 208 is received from path 165. Since for each photo detector, the two components of the received optical signals have the same frequency, the current generated by each photo detector is substantially independent of the optical signal frequency. The current generated by each photo detector 206, 208 is, however, substantially dependent on the difference between the phases of the two optical signals the phase detector receives. In other words, the current generated by each photo detector 206, 208 is defined, in part, by the difference between the phases of the signals travelling through paths 160, 165. Consequently, the current generated by each photo detector 206, 208 is representative, in part, of the frequency/phase noise of the optical signal 134 generated by optical phase modulator 114. Furthermore, in accordance with embodiments of the present invention, because phase/frequency noise detector 120 includes a pair of photo detectors, noise-induced imbalances, such as laser intensity noise are coupled to both optical paths 170, 180 and hence received in-phase by both photo detectors 206, 208, while the desired signal received by photo detectors 206, 208 is out-of-phase. As a consequence, photo detection circuit 210's output current signal $I_{out}$, defined by the difference between currents $I_1$, and $I_2$ which flow respectively through photo detectors 206, 208, has a substantially enhanced immunity to noise. Referring to FIGS. 2 and 3A, current signal $I_{out}$ generated by photo detection circuit 210 is delivered to phase wrapper 130. A transimpedance amplifier (not shown) may be used to convert current $I_{out}$ to a voltage and deliver this voltage to phase wrapper 130.

Figure 3B:
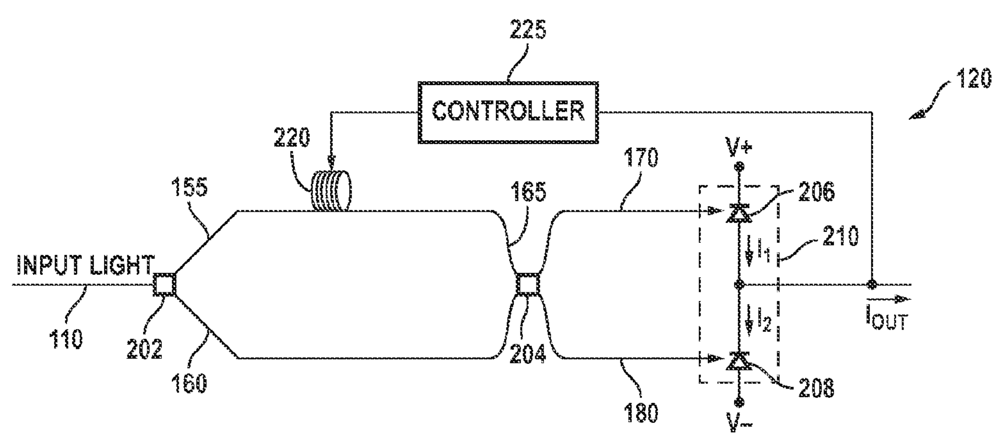

FIG. 3B is a simplified block diagram of another exemplary embodiment of frequency/phase noise detector 120 shown in FIG. 2. The frequency/phase noise detector shown in FIG. 3B is similar to the one shown in FIG. 3A except that the frequency/phase noise detector of FIG. 3B includes a resonator 220 disposed between delay paths 155, 165 and a controller 225 adapted to vary the delay through resonator 220 in accordance with a sample of current signal $I_{out}$ generated by phase detection circuit 210.

Figure 3C:
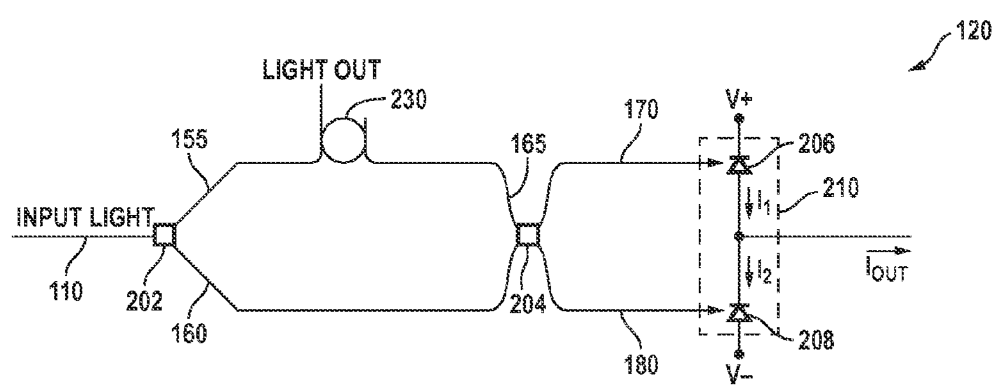

FIG. 3C is a simplified block diagram of another exemplary embodiment of frequency/phase noise detector 120 shown in FIG. 2. The frequency/phase noise detector shown in FIG. 3C is similar to the one shown in FIG. 3A except that the frequency/phase noise detector of FIG. 3C includes a ring/disk resonator 230 disposed between delay paths 155, 165 to generate a delay. The optical signal in path 155 is received by the add port of ring/disk resonator 230. The drop port of ring/disk resonator 230 delivers the optical signal to path 165.

Figure 3D:
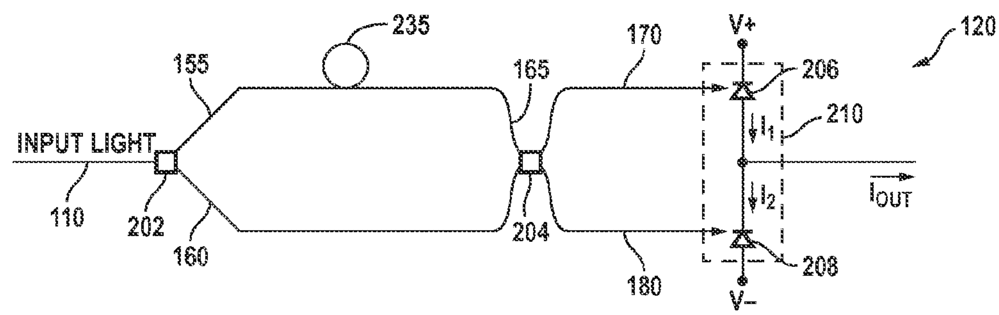

FIG. 3D is a simplified block diagram of another exemplary embodiment of frequency/phase noise detector 120 shown in FIG. 2. The frequency/phase noise detector shown in FIG. 3D is similar to the one shown in FIG. 3A except that the frequency/phase noise detector of FIG. 3D includes a ring/disk resonator 235 disposed between delay paths 155, 165 to generate a delay. The through ports of ring/disk resonator 235 are used to receive the optical signal from path 155 and deliver the optical signal to path 165.

Figure 3E:
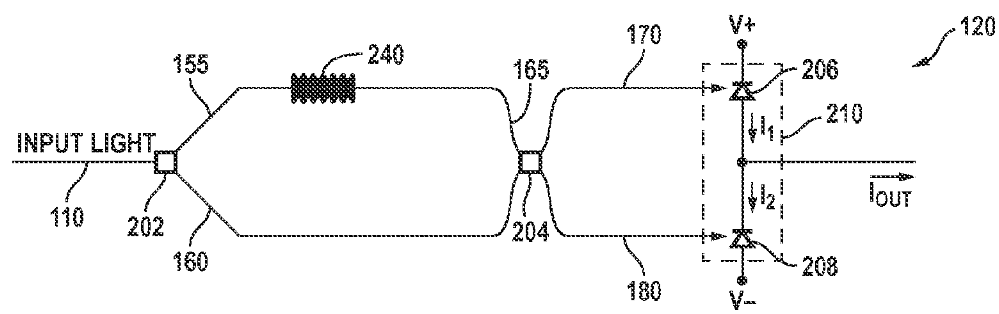

FIG. 3E is a simplified block diagram of another exemplary embodiment of frequency/phase noise detector 120 shown in FIG. 2. The frequency/phase noise detector shown in FIG. 3E is similar to the one shown in FIG. 3A except that the frequency/phase noise detector of FIG. 3E includes a waveguide grating 240 disposed between delay paths 155, 165 to generate a delay.

Frequency/phase noise detector 120 of FIG. 3A has a wideband frequency response due to its use of a true-time delay 212. The frequency/phase noise detectors shown in FIGS. 3B-3E have relatively narrower bandwidths. The bandwidths of the frequency/phase noise detectors shown in FIGS. 3B-3E may be increased by using multiple cascaded (or coupled) resonators (Vernier effect realization) or tapered designs.

Figure 3F:
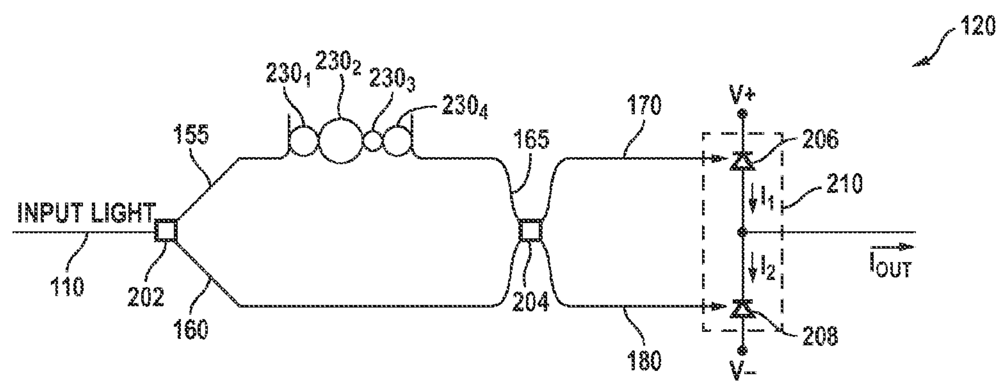

FIG. 3F is a simplified block diagram of another exemplary embodiment of frequency/phase noise detector 120 shown in FIG. 2, which includes a multitude of resonators coupled together to enhance the bandwidth of the resonator. Four such resonators $\mathbf{230_1}$, $\mathbf{230_2}$, $\mathbf{230_3}$, and $\mathbf{230_4}$ are shown as being used in frequency/phase noise detector 120 of FIG. 3F. Although it is understood that any number of such resonators may be coupled to one another to increase the bandwidth. It is also understood that resonators $\mathbf{230_1}$, $\mathbf{230_2}$, $\mathbf{230_3}$, and $\mathbf{230_4}$ may have similar to different sizes.

Figure 4:
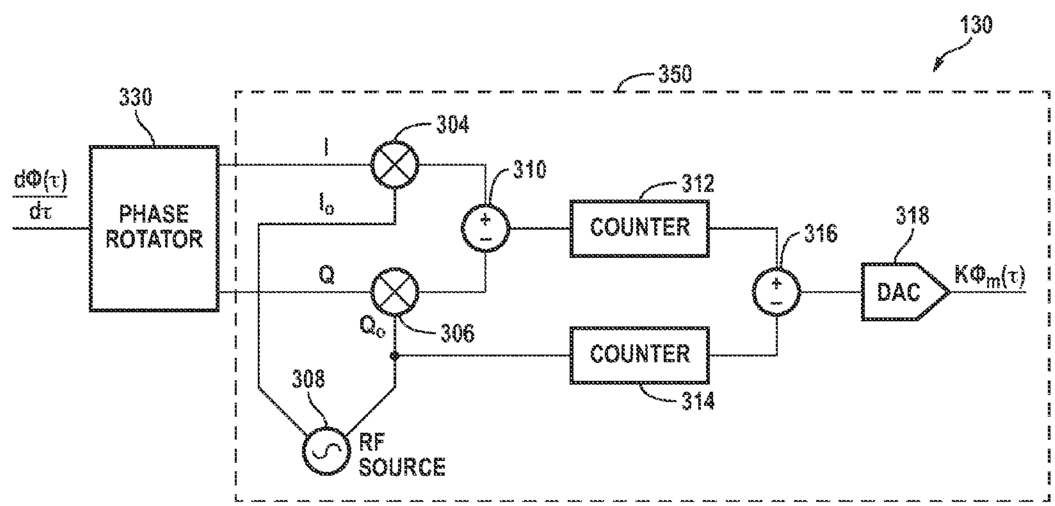
FIG. 4 is a block diagram of the phase wrapper shown in FIG. 2, in accordance with one exemplary embodiment of the present invention.

FIG. 4 is a block diagram of phase wrapper 130 shown in FIG. 2, in accordance with one embodiment of the present invention. Phase wrapper 130 is shown as including a phase rotator 330, as well as a phase estimator 350 adapted to perform sine inversion. Phase estimator 350 (also referred to herein as Sine inverter) is shown as including first and second mixers 304, 306, an oscillator 308, adders/subtractors 310, 316, counters 312, 314, and an optional digital-to-analog converter 318.

Assume that the phase noise of the optical signal being detected is characterized by a Brownian motion. Accordingly, the variance of the optical phase noise increases linearly with time. In one embodiment, the input-output voltage across phase rotator 330 may be defined as:

$$V_{out}(t)=A\sin(k\textstyle\int V_{in}(t)) \qquad (1)$$

where A and k are constants. Phase rotator 330 may be formed using any number of known phase rotators to achieve phase rotation.

Sine inverter 350 is adapted to discriminate the phase-wrapped phase noise of the optical signal it receives from phase rotator 330. The discriminated phase noise is subsequently subtracted from the phase of incoming optical signal 115 by phase modulator 114, as shown in FIGS. 1, 2.

As is seen from FIG. 4, mixers 304 and 306 of sine inverter 350 are adapted to down convert the frequency of the in-phase and quadrature-phase signal received from phase rotator 330 using RF source 308. Adder/subtractor 310 is adapted to subtract the output signal of mixer 306 from the output of mixer 304 to generate a signal whose number of transitions or zero crossings are counted by counter 312. Likewise, the number of zero-crossings of RF source 308 is counted by counter 314. Adder/subtractor 316 subtracts the output of counter 314 from the output of counter 312 to generate a digital signal representative of the phase noise Ø(t) of optical signals 134, 110, 105 (see FIGS. 1 and 2). DAC 318 is adapted to convert the digital output signal of adder/subtractor 316 to an analog signal.

Assume that the input of the phase rotator is represented by $$V_{in}x\frac{d\phi(t)}{dt},$$

with $V_{in}$ representing a constant and Ø(t) representing the phase noise of the incoming (input) signal, as described above. Accordingly, the output of adder/subtractor 310 may be represented as:

$$V_{out}(t)=A\sin(w_e t-K\phi_m(t)) \qquad (2)$$

where K represents a constant, $\phi_m(t)=\mathrm{mod}(\phi(t), 2\pi)$ represents the phase noise of optical signals 134,110, 105 and $w_e$ represents the angular frequency of oscillator 308. Accordingly, counter 312 generates a count defined by ($w_e t - KØ_m(t)$), and counter 314 generates a count defined by ($w_e t$). Consequently, the output of adder/subtractor 316 is a digital signal defined by $KØ_m(t)$, which is representative of the phase noise of optical signals 134, 110, 105. It is understood that any one of a number of known phase estimators that can estimate the phase Ø from Sin(Ø) or Cos (Ø) may be used.

Referring to FIGS. 2 and 4 concurrently, the output of DAC 318 is further amplified by driver 112 and applied to optical phase modulator 114. In response, optical phase modulator 114 subtracts the discriminated phase noise from the phase of the incoming optical signal 115. The optical signal 134 supplied by optical phase modulator 114 thus has a substantially reduced phase noise and linewidth, a portion of which is split off by splitter/coupler 104 and provided as output of light source independent feedback linewidth reduction system 100.

Figure 5A:
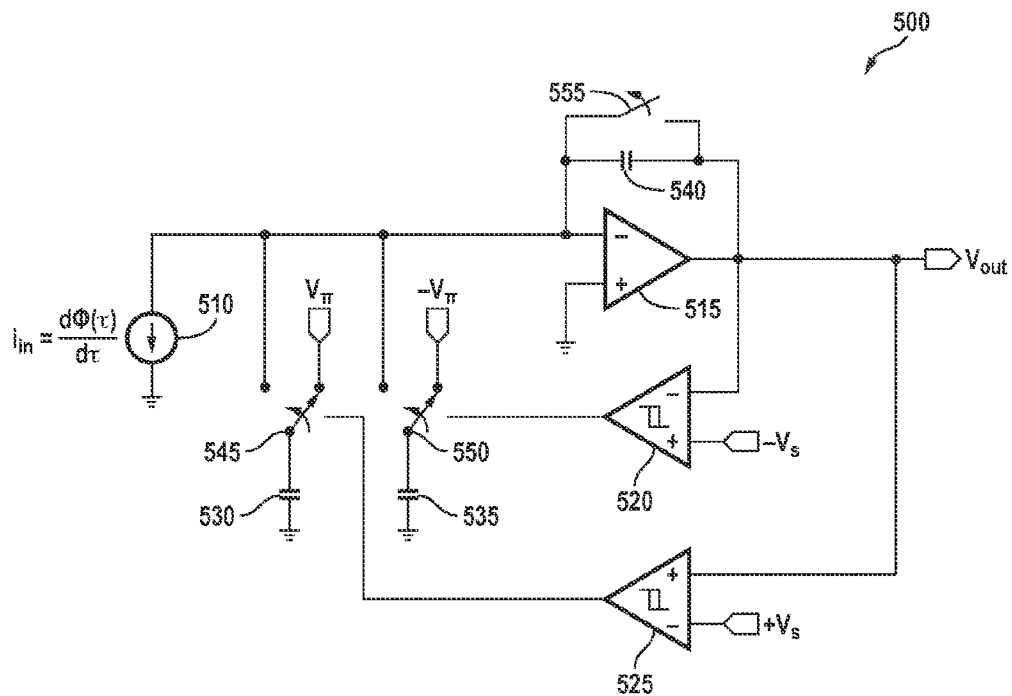
FIG. 5A is a block diagram of an integrating phase wrapper representing the phase wrapper shown in FIG. 2, in accordance with another exemplary embodiment of the present invention.

FIG. 5A is a block diagram of an integrating phase wrapper 500 representing phase wrapper 130 shown in FIG. 2, in accordance with another exemplary embodiment of the present invention. As described above, a transimpedance amplifier (not shown) may be used to convert the output current $I_{out}$ from frequency/phase noise detector 120 to a voltage, which is delivered to the phase wrapper 130 represented in FIG. 4. Alternatively, the output current $I_{out}$ from frequency/phase noise detector 120 represented by current source 510 may drive integrating phase wrapper 500 without a transimpedance amplifier, as shown in FIG. 5A. The output current $I_{out}$ from frequency/phase noise detector 120 provides the time derivative of the phase noise, $$\frac{d\phi(t)}{dt},$$

and its integration provides the phase noise, Ø(t), in optical signals 134, 110, 105.

Integrating phase wrapper 500 is shown as including an operational amplifier 515, comparators 520, 525, capacitors 530, 535, 540, and switches 545, 550, 555. Capacitor 540 and switch 555 are coupled across the negative input and output of operational amplifier 515 forming an integrator circuit adapted to integrate the output current $I_{out}$ from frequency/phase noise detector 120 represented by current source 510 to generate an integrated signal, $V_{out}$, which provides the phase noise, Ø(t), in optical signals 134, 110, 105.

Figure 5B:
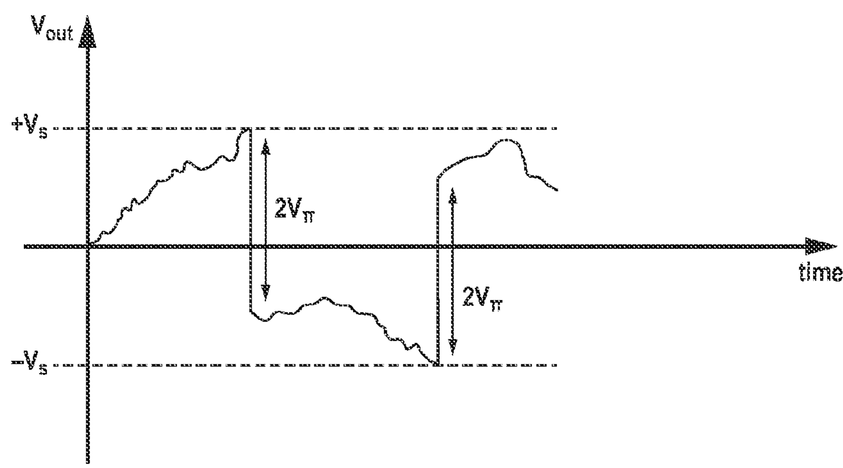
FIG. 5B is a representation of the voltage output versus time of the integrating phase wrapper shown in FIG. 5A.

FIG. 5B is a representation of the voltage output, $V_{out}$, versus time of the integrating phase wrapper shown in FIG. 5A. Referring to FIGS. 5A and 5B, initially switch 555 is closed which shorts the output of operational amplifier 515 to its negative input, which are both driven to the voltage applied to a positive input of operational amplifier 515, coupled to ground potential in this example. When switch 555 is opened at time=0, the integrator begins to integrate and integrated signal, $V_{out}$, begins to increase. As described above, the phase noise of the optical signal being detected may be characterized by a Brownian motion. Accordingly, the variance of the optical phase noise may continue to increase with time, resulting in the value of $V_{out}$ potentially approaching the power supply rails for operational amplifier 515 and causing distortion in the phase noise signal.

Because the phase noise and its wrapped version between $-\pi$ and $\pi$ has the same information, a control circuit may be adapted to maintain the integrated signal between predetermined voltages, $V_S$ and $-V_S$, which are within the distortion free operating range of operational amplifier 515 and optical modulator 114, by performing the phase wrapping. The phase wrapping changes the integrated signal voltage by a predetermined voltage value of $2V_\pi$ associated with a phase shift of $2\pi$ radians in phase modulator 114, as explained in detail below. Accordingly, predetermined voltage $V_S$ should be larger than predetermined voltage $V_\pi$.

Referring to FIGS. 5A and 5B, the control circuit includes comparators 520, 525, capacitors 530, 535, and switches 545, 550. Comparators 525, 520 are adapted to compare integrated signal, $V_{out}$, to predetermined voltages, $V_S$ and $-V_S$, respectively. At time=0, switch 545 is adapted to charge capacitor 530 to a predetermined voltage, $V_\pi$. Switch 545 is further adapted to transfer the predetermined charge from capacitor 530 to capacitor 540, thereby reducing the integrated signal, $V_{out}$, by a value associated with a phase shift of $2\pi$ in the phase modulator, when comparator 525 detects integrated signal, $V_{out}$, is substantially equal to predetermined voltage, $V_S$. In one example, capacitor 530 is designed to have a capacitance value substantially equal to twice the capacitance value of capacitor 540, which causes a voltage shift in $V_{out}$ of about $-2V_\pi$. It is understood that the choice of the ratio of capacitor 530 to capacitor 540 and the value of $V_\pi$ is flexible as long as the desired reduction in the voltage of the integrated signal, $V_{out}$, is by a value associated with a phase shift of $2\pi$ in the phase modulator. After transferring predetermined voltage, $V_\pi$, to capacitor 540, switch 545 is further adapted to recharge capacitor 530 to predetermined voltage, $V_\pi$.

Similarly, at time=0, switch 550 is adapted to charge capacitor 535 to a predetermined voltage, $-V_\pi$. Switch 550 is further adapted to transfer the predetermined charge from capacitor 535 to capacitor 540, thereby increasing the integrated signal, $V_{out}$, by a value associated with a phase shift of $2\pi$ (in the opposite direction compared to the example when charge is transferred from capacitor 530 to capacitor 540) in the phase modulator, when comparator 520 detects integrated signal, $V_{out}$, is substantially equal to predetermined voltage, $-V_S$. In one example, capacitor 535 is designed to have a capacitance value substantially equal to twice the capacitance value of capacitor 540, which causes a voltage shift in $V_{out}$ by about $2V_\pi$. It is understood that the choice of the ratio of capacitor 535 to capacitor 540 and the value of $-V_\pi$ is flexible as long as the desired increase in the voltage of the integrated signal, $V_{out}$, is by a value associated with a phase shift of $2\pi$ in the phase modulator. After transferring predetermined voltage, $-V_\pi$, to capacitor 540, switch 550 is further adapted to recharge capacitor 533 to predetermined voltage, $-V_\pi$. Accordingly, while integrated signal, $V_{out}$, is within the predetermined range of voltages between $V_S$ and $-V_S$, the integrated signal, $V_{out}$, is given by:

$$V_{out} = \frac{1}{C_1}\int_0^t i_{in}\,dt. \tag{3}$$

The above embodiments of the present invention are illustrative and not limiting. Various alternatives and equivalents are possible. Although, the invention has been described with reference to an optical signal source generating an incoming optical signal, which may respectively be a laser and laser beam by way of an example, it is understood that the invention is not limited by the laser or laser beam technology. Other additions, subtractions, or modifications are obvious in view of the present disclosure and are intended to fall within the scope of the appended claims.

What is claimed is:

1. An integrated optical linewidth reduction system comprising:

a phase modulator adapted to modulate the phase of an incoming optical signal in response to a feedback signal thereby to generate a first optical signal travelling through a first optical path, said feedback signal being a first electrical signal defined by the first optical signal, wherein an optical linewidth of the first optical signal is less than an optical linewidth of the incoming optical signal;

a first splitter/coupler adapted to split the first optical signal into at least second and third optical signals travelling through second and third optical paths said second optical path having a longer propagation delay than said third optical path;

a second splitter/coupler adapted to generate a fourth optical signal by coupling a first portion of the second optical signal with a first portion of the third optical signal and deliver the fourth optical signal to a fourth optical path, the second splitter/coupler being further adapted to generate a fifth optical signal by coupling a second portion of the second optical signal with a second portion of the third optical signal and deliver the fifth optical signal to a fifth optical path; and a photo detection circuit comprising first and second photo detectors, said first photo detector being adapted to generate a second electrical signal in response to the fourth optical signal, said second photo detector being adapted to generate a third electrical signal in response to the fifth optical signal, said photo detection circuit supplying a fourth electrical signal in response to the second and third electrical signals; said fourth electrical signal being representative of a phase noise of the first optical signal.

2. The integrated optical linewidth reduction system of claim 1 wherein said incoming optical signal is a laser beam.

3. The integrated optical linewidth reduction system of claim 1 further comprising:

a delay element disposed in the second optical path adapted to cause the longer propagation delay.

4. The integrated optical linewidth reduction system of claim 1 further comprising:

a resonator disposed in the second optical path adapted to cause the longer propagation delay; and a controller adapted to vary a delay associated with the resonator in accordance with a sample of the fourth electrical signal.

5. The integrated optical linewidth reduction system of claim 1 further comprising:

a ring/disk resonator disposed in the second optical path adapted to cause the longer propagation delay.

6. The integrated optical linewidth reduction system of claim 1 further comprising:

a waveguide grating disposed in the second optical path adapted to cause the longer propagation delay.

7. The integrated optical linewidth reduction system of claim 1 wherein each of said first and second photo detectors is a photo diode.

8. The integrated optical linewidth reduction system of claim 1 wherein said first portion of the second optical signal is substantially equal to the first portion of the third optical signal.

9. The integrated optical linewidth reduction system of claim 1 wherein said first portion of the second optical signal is different from the first portion of the third optical signal.

10. The integrated optical linewidth reduction system of claim 1 wherein said second portion of the second optical signal is substantially equal to the second portion of the third optical signal.

11. The integrated optical linewidth reduction system of claim 1 further comprising:

a phase wrapper adapted to generate the feedback control signal from the fourth electrical signal.

12. The integrated optical linewidth reduction system of claim 11 wherein said phase wrapper comprises:

a phase rotator adapted to generate an in-phase signal and a quadrature-phase signal in response to the fourth electrical signal; and an inverter adapted to perform a modulo operation on the in-phase and quadrature-phase signals.

13. The integrated optical linewidth reduction system of claim 12 wherein said inverter comprises:

a first mixer adapted to generate a first frequency converted signal in response to the in-phase signal and a first oscillating signal;

a second mixer adapted to generate a second frequency converted signal in response to the quadrature-phase signal and a second oscillating signal;

a first adder/subtractor adapted to subtract the second frequency converted signal from the first frequency converted signal;

a first counter adapted to count a number of transitions of the first adder/subtractor;

a second counter adapted to count a number of transitions of the second oscillating signal; and a second adder/subtractor adapted to subtract the second counter's count from the first counter's count to generate a difference representative of the phase noise of the first optical signal.

14. The integrated optical linewidth reduction system of claim 13 further comprising:

a digital-to-analog converter adapted to convert an output signal of the second adder/subtractor to an analog signal; and a driver adapted to generate and apply the feedback control signal to the phase modulator in response to the analog signal.

15. The integrated optical linewidth reduction system of claim 11 wherein said phase wrapper comprises:

an integrator circuit adapted to integrate the fourth electrical signal to generate an integrated signal; and a control circuit adapted to maintain the integrated signal between a first predetermined voltage and a second predetermined voltage by changing the integrated signal by a value associated with a phase shift of $2\pi$ in the phase modulator.

16. The integrated optical linewidth reduction system of claim 15 wherein said integrator circuit includes:

an operational amplifier including an inverting input coupled to the fourth electrical signal; and a first capacitor having a first capacitance value coupled between the inverting input of the operational amplifier and an output of the operational amplifier, wherein said control circuit includes:

a first comparator adapted to compare the integrated signal to the first predetermined voltage;

a second comparator adapted to compare the integrated signal to the second predetermined voltage;

a first switch adapted to charge a second capacitor to a third predetermined voltage, the first switch further adapted to transfer a first charge from the second capacitor to the first capacitor thereby reducing the integrated signal by a value associated with a phase shift of $2\pi$ in the phase modulator when the first comparator detects the integrated signal is substantially equal to the first predetermined voltage; and a second switch adapted to charge a third capacitor to a fourth predetermined voltage, the second switch further adapted to transfer a second charge from the third capacitor to the first capacitor thereby increasing the integrated signal by a value associated with a phase shift of $2\pi$ in the phase modulator when the second comparator detects the integrated signal is substantially equal to the second predetermined voltage.

17. A method of reducing linewidth of an incoming optical signal, the method comprising:

modulating the phase of the incoming optical signal in response to a feedback signal to generate a first optical signal travelling through a first optical path; and generating the feedback signal in accordance with the first optical signal, wherein said feedback signal is a first electrical signal, wherein an optical linewidth of the first optical signal is less than an optical linewidth of the incoming optical signal;

splitting the first optical signal into at least second and third optical signals travelling through second and third optical paths;

causing said second optical path to have a longer propagation delay than said third optical path;

generating a fourth optical signal by coupling a first portion of the second optical signal with a first portion of the third optical signal;

generating a fifth optical signal by coupling a second portion of the second optical signal with a second portion of the third optical signal;

generating a second electrical signal in response to the fourth optical signal;

generating a third electrical signal in response to the fifth optical signal; and generating a fourth electrical signal in response to the second and third electrical signals; said fourth electrical signal being representative of a phase noise of the first optical signal.

18. The method of claim 17 wherein said incoming optical signal is a laser beam.

19. The method of claim 17 further comprising:

disposing a delay element in the second optical path to cause the longer propagation delay.

20. The method of claim 17 further comprising:

disposing a resonator in the second optical path to cause the longer propagation delay; and varying a delay associated with the resonator in accordance with a sample of the fourth electrical signal.

21. The method of claim 17 further comprising:

disposing a ring/disk resonator in the second optical path to cause the longer propagation delay.

22. The method of claim 17 further comprising:

disposing a waveguide grating in the second optical path to cause the longer propagation delay.

23. The method of claim 17 wherein said first portion of the second optical signal is substantially equal to the first portion of the third optical signal.

24. The method of claim 17 wherein said first portion of the second optical signal is different from the first portion of the third optical signal.

25. The method of claim 17 wherein said second portion of the second optical signal is substantially equal to the second portion of the third optical signal.

26. The method of claim 17 further comprising:

generating the second electrical signal in response to a first photo-detector; and generating the third electrical signal in response to a second photo-detector.

27. The method of claim 17 further comprising:

generating an in-phase signal and a quadrature-phase signal in response to the fourth electrical signal; and performing a modulo operation on the in-phase and quadrature-phase signals.

28. The method of claim 27 further comprising:

converting a frequency of the in-phase signal using a first oscillating signal;

converting a frequency of the quadrature-phase signal using a second oscillating signal;

subtracting the frequency converted quadrature-phase signal from the frequency converted in-phase signal to generate a first difference signal;

counting a number of transitions of the first difference signal;

counting a number of transitions of the second oscillating signal; and finding a difference between the number of transitions of the second oscillating signal and the number of transitions of the first difference signal, said difference being representative of the phase noise of the first optical signal.

29. The method of claim 28 further comprising:

converting said difference to an analog signal; and modulating the phase of the incoming optical signal in accordance with the analog signal.

30. The method of claim 17 further comprising:

integrating the fourth electrical signal to generate an integrated signal;

maintaining the integrated signal between a first predetermined voltage and a second predetermined voltage by changing the integrated signal by a value associated with a phase shift of $2\pi$ in the phase modulator.

31. The method of claim 30 wherein said integrating includes:

providing an operational amplifier including an inverting input coupled to the fourth electrical signal; and coupling a first capacitor having a first capacitance value between the inverting input of the operational amplifier and an output of the operational amplifier, wherein said maintaining includes:

comparing the integrated signal to the first predetermined voltage;

comparing the integrated signal to the second predetermined voltage;

charging a second capacitor to a third predetermined voltage;

transferring a first charge from the second capacitor to the first capacitor thereby reducing the integrated signal by a value associated with a phase shift of $2\pi$ in the phase modulator when the integrated signal is substantially equal to the first predetermined voltage;

charging a third capacitor to a fourth predetermined voltage; and transferring a second charge from the third capacitor to the first capacitor thereby increasing the integrated signal by a value associated with a phase shift of $2\pi$ in the phase modulator when the integrated signal is substantially equal to the second predetermined voltage.

* * * * *